United States Patent [19]

Heineken et al.

[11] Patent Number: 4,731,254
[45] Date of Patent: Mar. 15, 1988

[54] METHOD OF, AND APPARATUS FOR, REPAIRING MECHANICAL AND/OR CHEMICAL DAMAGE TO THE SURFACE OF BOTTLES DESTINED FOR RE-USE

[75] Inventors: Alfred H. Heineken, Amsterdam, Netherlands; Reinhard Baumert, Frankfurt, Fed. Rep. of Germany; Hans Gaar, Frankfurt, Fed. Rep. of Germany; Ulrich Hoffmann, Frankfurt, Fed. Rep. of Germany; Ulrigh Roth, Frankfurt, Fed. Rep. of Germany; Wolfgang Schwämmlein, Frankfurt, Fed. Rep. of Germany

[73] Assignee: Heineken Technisch Beheer B.V., Amsterdam, Netherlands

[21] Appl. No.: 896,754

[22] Filed: Aug. 14, 1986

[51] Int. Cl.⁴ .................. B05D 3/06; B32B 35/00; C03B 29/02; B23K 9/00
[52] U.S. Cl. ........................ 427/53.1; 65/28; 65/104; 65/DIG. 4; 219/121 LD; 219/121 LF; 219/121 LT; 219/121 LW; 427/140

[58] Field of Search ............ 427/53.1, 140, 376.2; 219/121 LF, 121 L, 121 LA, 121 LM, 121 LD, 121 LR, 121 LT, 121 LE, 121 LW; 65/28, 104, DIG. 4

[56] References Cited

U.S. PATENT DOCUMENTS

| | | | |
|---|---|---|---|
| 4,338,114 | 7/1982 | Brockway et al. | 219/121 X |
| 4,609,566 | 9/1986 | Hongo et al. | 427/53.1 |
| 4,617,206 | 10/1986 | Haisma et al. | 427/53.1 |

*Primary Examiner*—Michael R. Lusignan
*Attorney, Agent, or Firm*—Merchant, Gould, Smith, Edell, Welter & Schmidt

[57] ABSTRACT

A method of, and apparatus for, repairing mechanical and/or chemical damage to the surface of glass bottles destined for re-use. A bottle to be repaired is brought to a temperature in the region of the transformation point of the glass of the bottle, its surface is thermally treated with laser beams, and during the treatment the bottle surface is linearly scanned with the laser beams while rotating the bottle about its longitudinal axis to repair the surface. The apparatus comprises a laser source and optical means for directing the laser beam generated by the laser source onto the surface of a bottle being treated.

23 Claims, 10 Drawing Figures

METHOD OF, AND APPARATUS FOR, REPAIRING MECHANICAL AND/OR CHEMICAL DAMAGE TO THE SURFACE OF BOTTLES DESTINED FOR RE-USE

This invention relates to a method of, and apparatus for, repairing mechanical and/or chemical damage to the surface of bottles destined for re-use Beer bottles intended for repeated use after prolonged use exhibit the effect of wear and tear, mainly in the upper and lower marginal areas of the cylindrical portion of the bottle. These effects are caused by attrition, shocks and bumps during transport and handling, in particular also, however, from the treatment in the washing, bottling and packing equipment in the brewery itself. When the effects of wear and tear have reached a certain extent, the bottles are no longer acceptable for aesthetic reasons, and they are discarded.

For "repair", or for avoiding these effects of wear and tear, hitherto only methods of applying a coating of synthetic plastics have been disclosed. Thermal aftertreatment processes have not so far been used for the repair of bottles.

In the glass industry, for smoothing the glass surface and for repairing minor flaws caused by moulding, in particular in the case of ornamental glasses, acid polishing or so-called "flame polishing" is used. It is also known for glass surfaces to be polished mechanically.

Acid polishing, however, is extremely disadvantageous on account of its inherent adverse effects on the environment, and by reason of the expensive removal of acid residues. Mechanical polishing is highly labour-intensive as compared with flame polishing.

Finally, it is also known for workpieces of glass to be subjected to abrasive or deforming operations, (fusing, cutting, drilling, engraving) by laser irradiation. In the case of engraving, for example, the laser radiation acts on glass workpieces at ambient temperature. In the case of more deeply acting irradiations of glass it has been found to be necessary for the workpieces to be heated prior to the irradiation to prevent the workpiece from bursting owing to undue sudden heating during its irradiation.

Specifically, German Pat. No. 3,207,274 discloses a method of polishing pre-ground surfaces on glass workpieces with laser beams, in which the workpieces are heated to close to the transformation point of glass prior to irradiation.

It is an object of the present invention to provide a method and apparatus of the above kind, which make it possible for slightly and heavily damaged bottles suitable for re-use to be repaired in a fast, economic and effective manner which is not a burden on the environment.

For this purpose the invention provides a method which comprises the steps of bringing a bottle to be repaired to a temperature in the region of the transformation point of the glass of the bottle, thermally treating the bottle with laser beams, and reparing the bottle by linearly scanning its surface with laser beams while rotating the bottle abouts its longitudinal axis.

Unlike the same polishing process or the laser polishing process referred to above, the process according to the present invention not only makes it possible to polish the glass surface, but also to melt or fuse large damaged areas with relatively deep grooves with a roughness depth of more than 10 micron to form a smooth surface.

The process must be controlled so that the damaged areas are just smoothed, but the bottle is not deformed. This means that the source of heat must bring considerably more energy to the surface than can be dissipated to the interior of the glass in the same time by heat conduction. To prevent distortion, the thermal treatment may be subdivided into several cycles.

The high temperature gradient between the surface and the interior of the glass which is generated in this thermal process can only then be sustained by the glass material without damage if the glass is brought to a temperature level close to the softening region (transformation temperature 500°–600° C.), so that the stresses inroduced by sudden temperature change can be rapidly compensated for and reduced by plastic compensating movements.

During the fusing process the volatile gas components (alkaline and alkaline earth metal oxides) are evaporated. Owing to the resulting reduced flux content in the areas close to the surface, the coefficient of expansion is decreased, as a consequence of which the glass surface comes to be under a compressive stress, which enhances the firmness of the bottle. The hardness and chemical resistance are enhanced, too. This means that owing to the thermal treatment of the surfaces the use characteristics are improved.

It also follows, however, that in the case of a repetition of the thermal "bottle repair" more heat must be used. It is also possible, however, before the thermal treatment proper to apply a glass resembling the composition of the bottle glass to the damaged areas of the bottle and to fuse this during the thermal treatment.

It has been found to be advantageous to apply a coating of titanium dioxide or tin oxide during or after the thermal treatment of the bottle surface.

The only suitable source of laser radiation for the thermal treatment of glass surfaces is one having a high capacity, as the wavelength of 10.6 micron emitted is absorbed in less than 1 micron depth of the glass. At present the only suitable laser for the purpose is a $CO_2$ laser. In addition, the $CO_2$ laser is the only laser type capable of supplying optical intensities in the kilowatt range. As laser radiation can be focussed, it is possible to realize power densities in the order of megawatt/$cm^2$ and in glass specifically to generate these high power densities direct in the glass surface in a very short time.

Smooth fusing of deeper damaged areas is effected by heat conduction. As the total energy is introduced in a thin surface layer, the risk of bottle distortion from thermal softening of the total bottle wall is extremely slight.

To reduce natural reflection of the glass, it is possible for the glass surface to be mechanically roughened, e.g. by sand blasting, prior to the laser treatment. This pretreatment makes it possible to carry out the laser irradiation with lower laser powers.

A preliminary study of smoothing the surface by instantaneous heating with laser beams clearly showed that this makes it possible to make worn bottle surfaces perfectly smooth without distortion of the bottle. The bottle temperature was slightly above the transformation temperature of the glass. The duration of the treatment was in the range of several seconds.

In a further series of tests, the fusion of the outer surface was carried out with a laser beam linearly focussed in the vertical direction with the bottle rotating about its longitudinal axis. We were able to show that by vertically shifting the laser beam and the cylindrical lens used (length of focus: 125 mm, line length of focus: 20 mm) and rotating the bottle, the total worn area could be smoothed up to the complete height of about 110 mm. The introduction of energy into the bottle surface can be effected with various ray guiding and projection systems.

The invention also provides apparatus suitable for carrying out the above method. Some embodiments of such an apparatus will now be described, by way of example, with reference to the accompanying drawings, in which FIG. 1a shows a diagrammatic elevational view of a first apparatus according to the invention;

FIG. 1b shows a modification of the apparatus shown in FIG. 1a;

FIG. 1c shows a different modification of the apparatus of FIG. 1a;

FIG. 2b shows a modification of the apparatus of FIG. 2a;

FIG. 2c shows another modification of the apparatus of FIG. 2a;

FIG. 3b shows a top plan view of the lens 14 of the apparatus of FIG. 3a;

FIG. 4b shows a top plan view of lenses 18 and 19 of the apparatus illustrated in FIG. 4a.

In the figures, like parts are designated by like reference numerals.

Figure 1A:
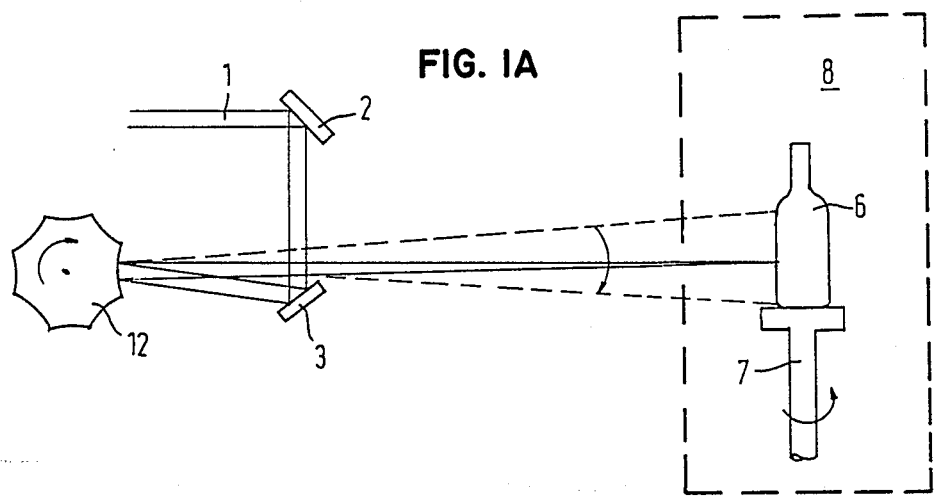

FIG. 1a diagrammatically shows the structure of a first apparatus according to the present invention.

A horizontally extending $CO_2$ laser beam 1 from a laser source not shown is deflected vertically downwards by means of a high-reflecting plane metal mirror 2. A second plane mirror 3 deflects the laser beam to a focussing pivoting mirror 4. Mirror 4 is pivotable about its horizontal axis 5. The pivoting mirror is off-set in the horizontal plane to such an extent that the laser beams reflected by the pivoting mirror can be passed laterally past mirror 3. The provision of mirrors 3 and 4 results in a small angle of incidence or reflection and so ensures optimal focussing of the laser beam by the spheric concave mirror 4.

The focussed laser beam impinges upon the surface of a glass bottle 6 in the focal plane of the mirror 4. The glass bottle stands on a rotary table 7. The table and the glass bottle are disposed in an electrically heated furnace 8.

The pivoting mirror 4 forms part of a pivoting mirror oscillator formed as a resonance vibrator. The pivoting mirror moves sinusoidally with a fixed frequency of e.g. 180 Hz and a vertical stroke of about 110 mm on the cylindrical part of the bottle. The resulting average rate of vertical displacement is 40,000 mm/s. The circumference of the glass bottle is 198 mm, so that 1/5th rotation of the bottle per second results in a rate of horizontal displacement of 40 mm/s.

The minimum focal spot of the laser beam with pivoting mirror 4 having a focal distance of 1000 mm is 0.7 mm. Taking into account the rate of vertical and horizontal displacement, it is found that a vertical surface strip of the glass bottle 0.7 mm wide is covered pointwise by the laser beam about 12 times. By reason of the high heat capacity of the glass, the vertically advanced laser beam accordingly produces a linear fusing surface of 0.7 mm wide and 110 mm high, which upon rotation of the bottle moves along the circumference of the bottle. Thus the surface of the bottle is rendered completely smooth during only one revolution thereof.

Figure 1B:
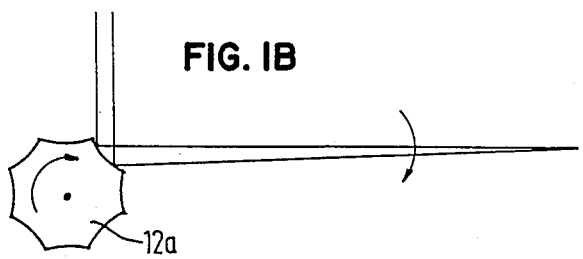

As shown in FIG. 1b, mirrors 3 and 4 can be combined to form an aspherically formed pivoting mirror 9. The geometrical distortion caused by the large angle of incidence and reflection in a normal spherical concave mirror is here corrected by an aspherical form of the mirror.

Figure 1C:
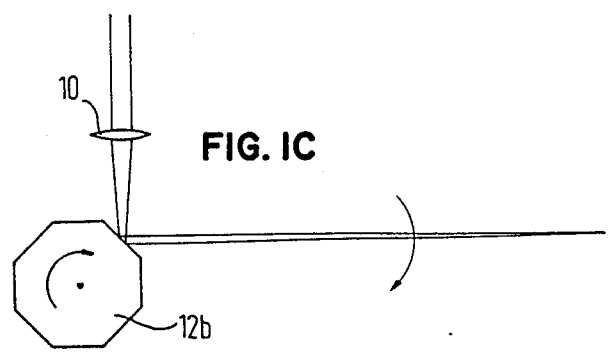

As shown in FIG. 1c, the combination of a focussing lens 10 and a pivoting plane mirror 11 gives a further possibility of linear fusion. The laser beam is focussed onto the bottle surface by means of a biconvex lens 10 (generally a ZnSe lens), with the focussed beam being deflected by a pivoting plane mirror 11 through 90° within the focal distance of the lens.

In the embodiment of FIGS. 1a–c, the laser beam moves dependently on the control signal for the pivoting mirror over the bottle surface, for example, in a sinusoidal or triangular shape.

Figure 2A:
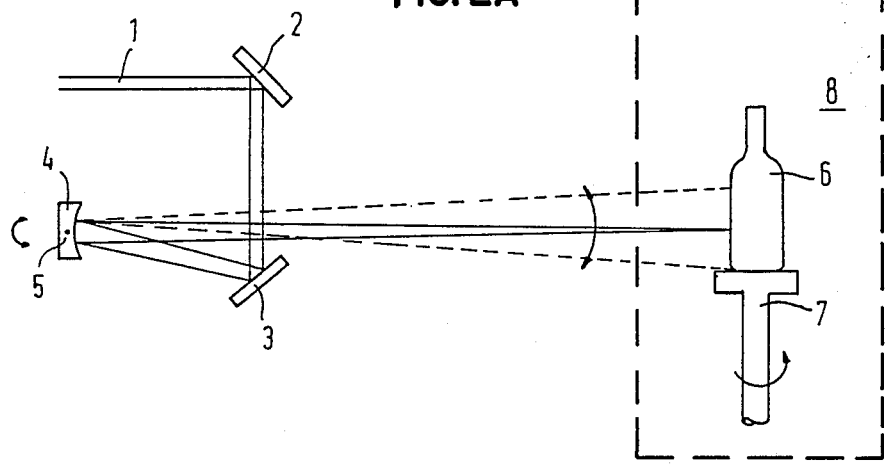
FIG. 2a shows a diagrammatic elevational view of a second apparatus according to the present invention.

FIG. 2 shows a different embodiment, in which the oscillating mirror 4 of FIG. 1a has been replaced by a rotary mirror 12 of polygonal shape, which periodically deflects the laser beam in one direction. The individual mirror segments of the polygonal mirror may be formed as spherical concave mirrors 12a in the apparatus of FIG. 2a.

Figure 2B:
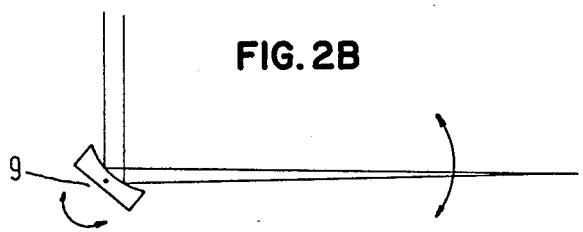
Figure 2C:
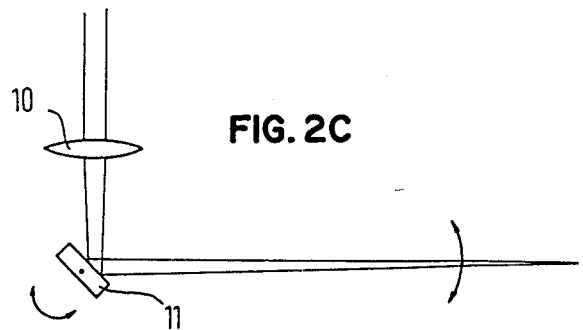

In the system of FIG. 2b, the mirror segments 12a are of aspherical form, which has the advantage that the reflecting surfaces 2 and 3 are unnecessary. In the system of FIG. 2c, the mirror segments 12b are planar, and there is provided a biconvex lens for focussing the laser beam.

Figure 3A:
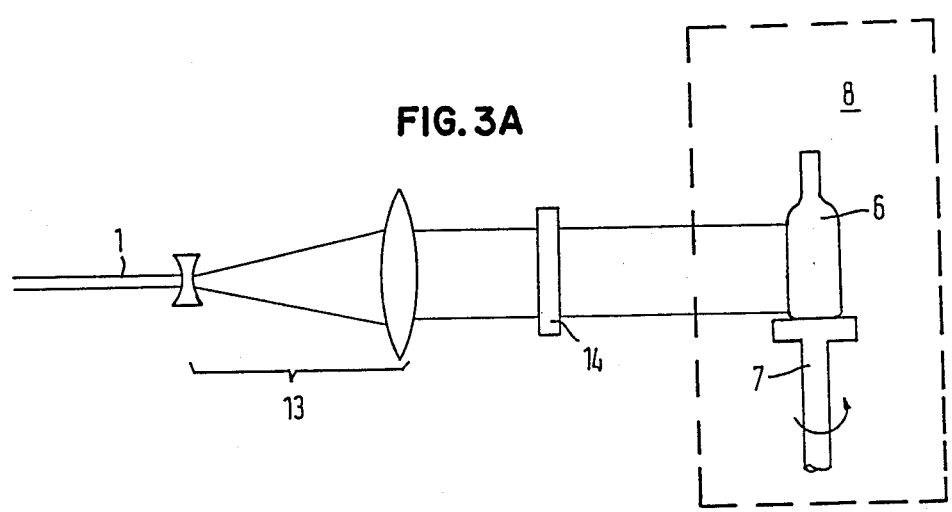
FIG. 3a shows a diagrammatic elevational view of a third apparatus according to the present invention.
Figure 3B:
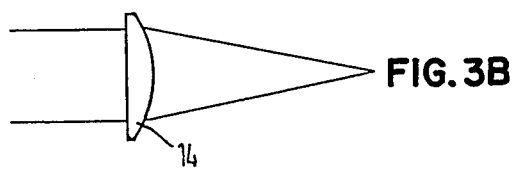

FIG. 3 shows an apparatus in which the beam 1 is widened by means of a beam widening lens system 13 to a diameter of 110 mm, and, with a correspondingly large cylindrical lens 14, focussed onto the bottle surface as a line. In this embodiment the worn surface is smoothed during one revolution of the bottle only.

Naturally, by a suitable selection of the optical system the height of the bottle surface treated can in principle be adjusted to any desired value.

Figure 4A:
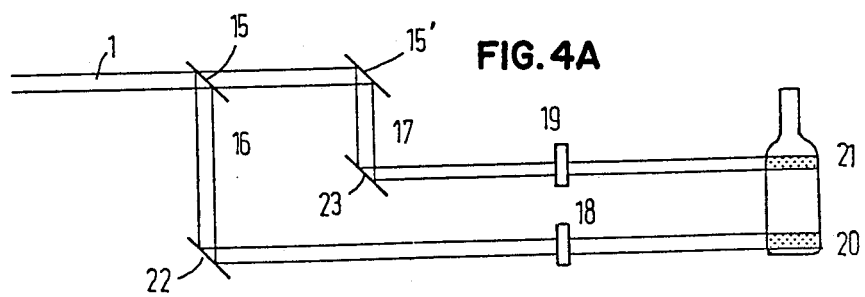
FIG. 4a shows a diagrammatic elevational view of a fourth apparatus according to the present invention.
Figure 4B:
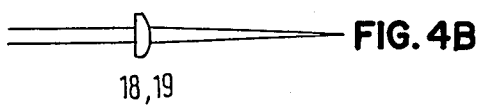

In the apparatus of FIG. 4, the laser beam 1 is divided into two sub-beams 16 and 17 by means of a beam splitter 15, 15'. Each sub-beam is focussed by means of respective mirrors 22, 23 and cylindrical lenses 18, 19 onto the bottle surface in such a manner that the principal zones of wear 20, 21 at the top and bottom margins of the cylindrical portion of the bottles are irradiated. The treatment of the complete height of the surface to be smoothed can in principle be effected with several, closely adjacent vertical sub-beams.

In the systems illustrated in FIGS. 1-3, adjacent vertical linear areas are successively treated by means of a laser beam focussed to a focal spot, and continuously deflected vertically. It is also possible, however, to treat successively adjacent horizontal areas. For this purpose, for example, the laser beam can be focussed by means of a cylindrical ZnSe lens (typical diameter 20 mm, focal length up to 500 mm), deflected by means of a 90° tilting mirror, and focussed as a line onto the bottle surface. After each revolution of the bottle, the focus is shifted one line height by the tilting mirror until the total surface to be smoothed has been treated throughout the entire height of 110 mm. Alternatively, the laser beam could be continuously shifted in the vertical direction. The pitch of the helix of irradiation per revolution is then maximally the height of one line.

It would also be possible to use a spherical lens, when the pitch of the helix of irradiation may be selected no higher than the diameter of the focal spot.

For this last embodiment the geometrical arrangement could be similar to the apparatus of FIG. 1c, with the pivoting mirror 11 being replaced by a tilting mirror.

In the optics in which the laser beam is focussed to a point it is generally desirable to homogenize the intensity distribution over the cross section of the laser beam by means of a variable integrator, or to adapt it to the wear. In this way an optimum intensity distribution of the laser beam on the bottle surface can be achieved.

The irradiation optics can be accommodated in known manner in a mechanical structure permitting computer-controlled beam motion. The optics are then protected from dirt and burning by protective gas devices (compressed air).

The number of bottles to be simultaneously treated in an apparatus is determined by means of beam division by beam splitters. The requisite data about intensity losses, division ratios, and about the geometry of sub-beam steering can be obtained in experiments for polishing surfaces with sub-beams.

We claim:

1. A method of repairing mechanical and/or chemical damage to the surface of glass bottles destined for reuse, comprising the steps of: bringing a bottle to be repaired to a temperature in the region of the transformation point of the glass of the bottle; thermally treating the bottle with laser beams; and linearly scanning the surface of the bottle with laser beams while rotating the bottle about its longitudinal axis, wherein the bottle is not translated linearly.

2. A method as claimed in claim 1, wherein the bottle is brought to a temperature of 500°-600° C., and the laser beams are generated by means of a $CO_2$ laser.

3. A method as claimed in claim 1, wherein the bottle surface is scanned along lines essentially extending vertically along the bottle surface.

4. A method as claimed in claim 2, wherein the bottle surface is scanned along lines essentially extending vertically along the bottle surface.

5. A method as claimed in claim 1, wherein the bottle surface is scanned along lines essentially extending horizontally along the bottle surface.

6. A method as claimed in claim 2, wherein the bottle surface is scanned along lines essentially extending horizontally along the bottle surface.

7. A method as claimed in claim 1, wherein, prior to the thermal treatment, a glass resembling bottle glass is brought to a place to be repaired on the bottle surface, which glass is fused to the surface during the thermal treatment.

8. A method as claimed in claim 1, wherein, during or after the thermal treatment, a layer of titanium oxide or tin oxide is applied to the bottle surface.

9. A method as claimed in claim 2, wherein, during or after the thermal treatment, a layer of titanium oxide or tin oxide is applied to the bottle surface.

10. A method as claimed in claim 7, wherein, during or after the thermal treatment, a layer of titanium oxide or tin oxide is applied to the bottle surface.

11. A method as claimed in claim 1, wherein, prior to the irradiation with laser beams, the glass surface is mechanically roughened.

12. Apparatus for repairing mechanical or chemical damage to the surface of glass bottles destined for reuse, comprising: a laser source; optical means for directing the laser beam generated by said laser source to the surface of a bottle being treated and along the surface of the bottle so that the bottle need not be translated linearly; means for bringing the bottle to a temperature in the region of the transformation point of the glass; and means for rotating the bottle about its longitudinal axis.

13. Apparatus according to claim 12, wherein said optical means comprises an oscillating pivoting mirror forming a linear melting surface on the bottle surface, parallel to the longitudinal axis of the bottle.

14. Apparatus according to claim 13, wherein the pivoting mirror is a planar mirror, a biconvex spherical lens being provided in the optical path to the mirror, which lens focuses the laser beam via the mirror onto the bottle surface.

15. Apparatus according to claim 13, wherein the pivoting mirror has a concave spherical mirror surface which focuses the laser beam on the bottle surface.

16. Apparatus according to claim 13, wherein said optical means are arranged to form a linear focus on the bottle surface, which is shorter than the height of a damaged portion of the bottle, the mirror being incrementally movable for directing the laser beam into successive regions on the bottle surface.

17. Apparatus according to claim 12, wherein said optical means comprises a rotary polygon-shaped mirror for forming a linear melting surface on the bottle surface parallel to the longitudinal axis of the bottle.

18. Apparatus according to claim 17, wherein said polygon-shaped mirror has planar mirror surfaces, a biconvex spherical lens being provided in the optical path to the mirror, which lens focuses the laser beam via the mirror on the bottle surface.

19. Apparatus according to claim 17, wherein said polygon-shaped mirror has concave spherical mirror surfaces which focus the laser beam on the bottle surface.

20. Apparatus according to claim 12, wherein said optical means comprises at least one cylindrical lens for focussing the laser beam on the bottle surface linearly and parallel to the longitudinal axis of the bottle.

21. Apparatus according to claim 17, wherein said optical means are arranged to form a linear focus on the bottle surface, which is shorter than the height of a damaged portion of the bottle, the mirror being incrementally movable for directing the laser beam onto successive regions on the bottle surface.

22. Apparatus according to claim 12, wherein said optical means comprises a biconvex spherical lens, a movable mirror being disposed in the optical path between said lens and the bottle surface, via which the bottle surface is scanned helically.

23. Apparatus according to claim 20, wherein the optical means divides the laser beam into sub-beams and directs each of said sub-beams via a cylindrical lens onto predetermined regions on the bottle surface.

* * * * *